United States Patent [19]
Desjonqueres

[11] 3,947,181
[45] Mar. 30, 1976

[54] TOOL ASSEMBLY

[75] Inventor: Henry Desjonqueres, Paris, France

[73] Assignee: Carnaud Total Interplastic, Chalon-sur-Saone, France

[22] Filed: Sept. 25, 1973

[21] Appl. No.: 400,540

[52] U.S. Cl........ 425/242 B; 425/326 B; 425/387 B; 425/DIG. 205; 425/DIG. 209; 425/DIG. 213
[51] Int. Cl.$^2$........................................ B29D 23/03
[58] Field of Search......... 425/326 B, 387 B, 242 B, 425/DIG. 205, DIG. 209, DIG. 213; 79/826; 192/67 P

[56] References Cited
UNITED STATES PATENTS

| | | | |
|---|---|---|---|
| 2,602,898 | 7/1952 | Inghram et al. | 192/67 P |
| 2,853,736 | 9/1958 | Gussoni | 425/DIG. 209 X |
| 3,100,913 | 8/1963 | De Matteo | 425/DIG. 209 |
| 3,544,284 | 12/1970 | Iannucci | 74/826 X |
| 3,584,337 | 6/1971 | Aoki | 425/DIG. 209 X |
| 3,690,799 | 9/1972 | Johnson | 425/DIG. 209 |
| 3,694,121 | 9/1972 | Johnson | 425/DIG. 205 |
| 3,697,210 | 10/1972 | Johnson | 425/242 B X |

Primary Examiner—Travis S. McGehee
Assistant Examiner—Z. R. Bilinsky
Attorney, Agent, or Firm—Pennie & Edmonds

[57] ABSTRACT

A press for molding and blowing hollow articles includes plural mold halves disposed in a table at successive work stations about an axis, a platen carrying complimentary mold halves movable toward and away from the table, and a tool carrier journaled in that axis, reciprocatable with the platen and rotatable to index the tools from one station to another. A first collar journaled in the table about the shaft is rotatable for indexing purposes, and a second collar coupled to the shaft is provided for rotational engagement with the first collar to accept torque from the first collar while the mold halves are open, subject to manual disengagement of the collars by shift of the second collar axially of the shaft.

8 Claims, 12 Drawing Figures

TOOL ASSEMBLY

The present invention pertains to a tool assembly constituting part of a press.

The invention is applicable to presses of all kinds for working various material such as wood, metal, plastics and the like.

More particularly, according to one feature of the invention, the apparatus thereof is particularly adapted for use with machines for molding plastic materials into hollow bodies such as bottles and flasks.

Machines for the formation of hollow plastic bodies as heretofore known include means to effect transfer of a blank or parison through a succession of work stations. In the course of a cycle of such a machine, the tool assembly is first stationary while the molds are closed, with the tool or tools extending, in some cases, into one or more of the closed molds. Upon opening of the molds the tool assembly is freed and is shifted so as to transfer each tool and a partially finished article thereon to the following work station, whereupon the tool assembly is again immobilized upon renewed closure of the molds. A complete cycle of the machine may include a number of such phases or steps.

The invention provides improved apparatus of this kind.

BRIEF DESCRIPTION OF THE DRAWINGS

The invention will now be further described in a number of presently preferred exemplary embodiments and by reference to the accompanying drawings in which.

DESCRIPTION OF THE PREFERRED EMBODIMENTS

Figure 1:
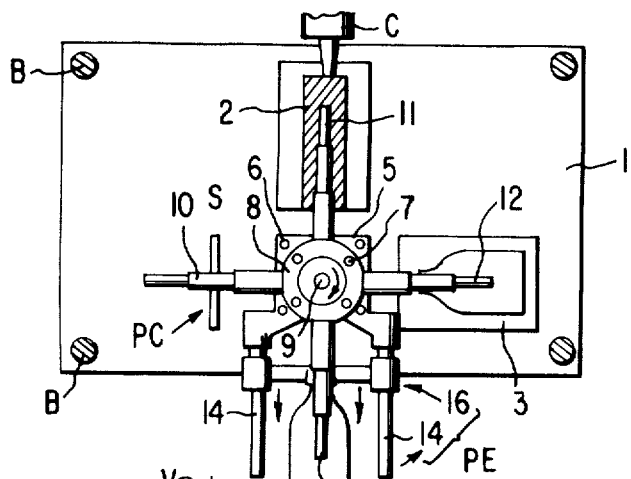
FIG. 1 is a schematic representation in plan of part of a molding machine in accordance with the invention.

In the description now to be given, reference will be made for simplicity to a machine for molding articles from plastic material. It is to be understood, however, that the invention can be applied to all forms of machines employing a press and irrespective of the nature of the working material.

Moreover, in the following description the same reference character will be applied to corresponding elements of structure throughout the several views.

Referring first to FIG. 1, there is there shown in plan a mold press wherein reference character 1 identifies the support for stationary halves 2 and 3 of two molds and wherein reference character B identifies the guiding columns for a movable plate A (FIG. 2) which carries the upper, movable halves of the molds.

In the example under consideration, two molds are provided, equidistant from the axis of a vertical shaft 9. The mold of which element 2 is a half is an injection mold into which the plastic material to be molded is introduced from a plasticizing machine of known character and of which the nozzle end is shown schematically at C. The mold of which element 3 is a half is a blowing or finishing mold.

Table 1 carries, between the mold halves 2 and 3, a fixed turret support 5 in which is mounted a tool carrying turret intended to cooperate with the molds. The support 5 is fixed to the table 1 by bolts 6 and it carries guide pins 7 equiangularly spaced from each other and intended to cooperate with holes 7' which are formed at regular intervals in a turret hub 8 fixed to the upper end of a vertical shaft 9. Shaft 9 is journaled in the body 5 so as to be free to rotate and to move axially with respect thereto.

Tool carrying arms 10, 11, 12 and 13 radiate from the hub 8 and are angularly spaced by the same angles as are the mold halves 2 and 3, with reference to the axis of the shaft 9. In the example under consideration, there are four tool-carrying arms spaced 90° apart and four pins 7 likewise spaced 90° apart.

In addition, the apparatus is such that when the pins 7 engage the holes 7', two adjacent tool arms are aligned with the two molds. Of the other two arms, one will then be disposed in alignment with the ejection station, generally indicated at PE, and the fourth will be aligned with a control or checking station PC for the tool thereon before its transfer, on the next motion of shaft 9, to the injection location occupied by mold 2. In FIG. 1 it is assumed that the hub 8 rotates clockwise. At the station PC, a check is effected on the temperature and cleanliness of the tool (not shown) on the tool carrier 10, prior to its presentation to the mold 2 on the next indexing step of the machine. The tool must not be contaminated with traces of the molding material. Means S of known type may be provided at the control station PC to stop the machine if the tool on carrier 10 is found to be contaminated.

Diametrically opposite from the first mold 2 is disposed the ejection station PE for the finished articles, such as bottles in the case under consideration. The ejection station comprises two parallel guide rods 14 affixed to the table 1, these rods extending perpendicularly to shaft 9 and serving as guides to a demolding or ejection carriage generally indicated at 16 which will be further described hereinbelow.

Figure 2:
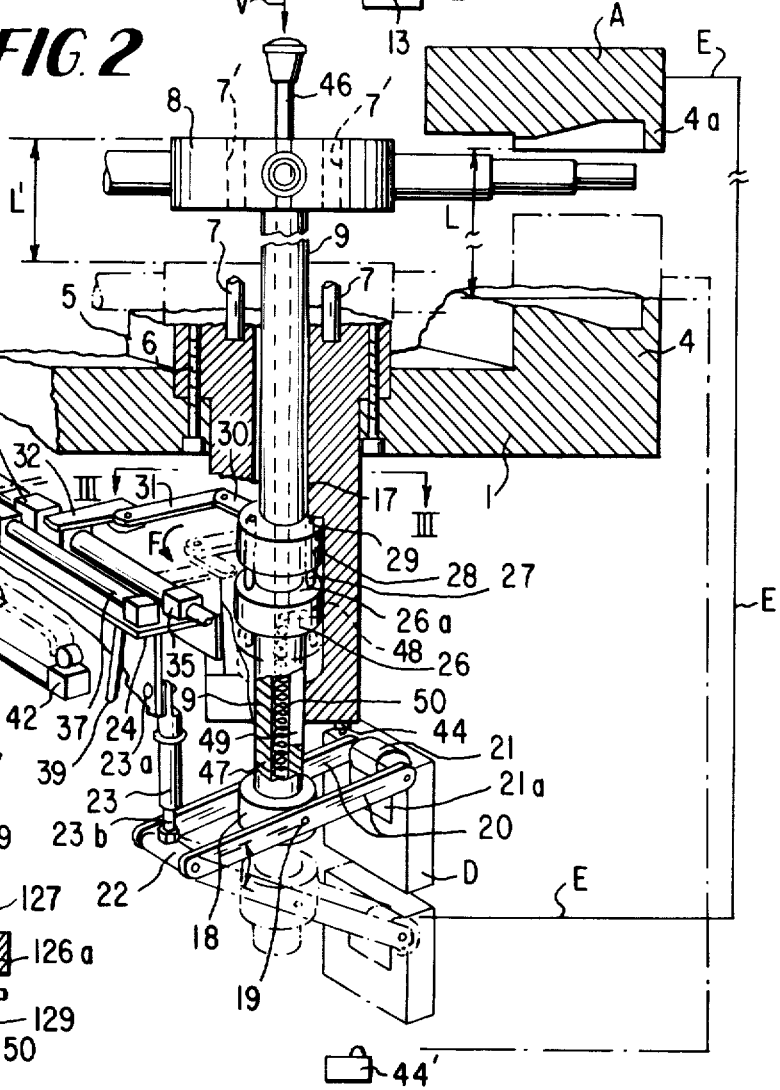
FIG. 2 is a fragmentary view, partly in perspective and partly in vertical section, of apparatus according to the invention and of which that shown in FIG. 1 constitutes a part.

As is seen more particularly with reference to FIG. 2, the shaft 9 is disposed for axial (vertical) motion and also for rotation in a vertical opening 17 of the support 5. The lower end of shaft 9, which extends below support 5, carries a collar 18 in which the shaft is permitted to turn but which is affixed to the shaft with respect to axial motion. The collar 18 carries two diametrically opposite trunnions 19 on which are articulated the arms 20 of a coupling device serving to connect the shaft 9 to a command element D. Element D is fixed, by means of a link diagrammatically indicated at E, to the movable plate A. This head D is subject to translation vertically between the positions shown therefor in full and dashed lines in FIG. 2. It possesses a socket 21a into which there extend the extremities of the arms 20 carrying a cam follower 21 in rolling contact with the inclined plane wall of the socket 21a. Between the opposite ends of the arms 20 there extends a pin 22 to which the arms 20 are pivoted. The pin 22 is suspended from the fixed frame of the machine (indicated at 24) by an attachment device 23 of adjustable length. One end of this device is fixed to the pin 22 whereas the other end thereof is coupled by a ball and socket joint to a pin 23a fixed to the machine frame. The coupling 23 just described and the inclined plane-roller coupling 21, 21a of the arms 20 to the device D make it possible for the arms 20 to impose vertical, axial motion on the shaft 9 when the device D is moved upwardly or downwardly.

Shaft 9 is also coupled to a ring 26 disposed inside the body 5, the ring 26 being disposed for motion with the shaft 9 by operation of a disengageable coupling to be described hereinafter. The ring 26 carries fingers 27 destined to enter into corresponding holes 29 of a rotatable ring 28. Ring 28 surrounds the shaft 9 but this shaft is freely movable with respect to the ring 28, both vertically and rotationally, that ring being maintained in fixed axial position in the body 5 while being free to rotate with respect to it. The ring 28 has affixed thereto a radial extension or lever 30 which extends outside the body 5 and to which is coupled one end of a link 31 whose other end is articulated to a plate 32 fixed to a shaft 33 slidably supported in bearings 34 and 35 fixed with reference to the body 5.

Shaft 33 is coupled to a driving element which takes the form of the piston in a hydraulic cylinder 37. This piston effects reciprocating motion of the shaft 33, as indicated by the double-headed arrow in FIG. 2. Preferably, the cylinder is double-acting, both of the to-and-fro motions of its piston being driven. The cylinder receives an operating or driving fluid from supply conduits 38 and 39.

The shaft 33 and the piston of cylinder 37 are coupled together by means of a plate 40 which includes as an extension thereof an arm 41 positioned to engage contacts 42 and 43 stationarily mounted with respect to body 5. The contacts 42 and 43 define the limits of travel of plate 40 and shaft 33.

The apparatus operates as follows:

Taking as the start of the cycle the moment in which a completed bottle or other plastic object has been ejected, the apparatus will be in the position shown, for the movable elements thereof, in dashed lines in FIG. 2 wherein:

a. the molds are closed, the collar 18, shaft 9 and ring 26 being in their lower position;

b. the hub 8 of the tool turret is lowered and is held against rotation by the pins 7 engaged in its holes 7';

c. the piston of cylinder 37 is at the end of its return stroke (to the right, in FIG. 2) and the arm 41 has operated contact 42, thereby terminating this return stroke;

d. the ring 28 is in its rest position (rotated counterclockwise, in FIG. 2) and the link 31 is disposed parallel to the shaft 33 (dash line showing of link 31 and lever 30 in FIG. 2).

Operation of contact 42 at the end of the return stroke for the piston of cylinder 37 initiates lifting of the upper mold halves A through a distance L. In consequence, element D lifts the shaft 9 and hub 8 through a distance L'. Preferably, L' is equal to L/2 and the trunnions 19 will hence be disposed in the middle or at the mid-point of the arms 20 to effect a 2-to-1 demultiplication of motion.

The elements will then be disposed in the full line position of FIG. 2, wherein:

a. the hub 8 is freed from pins 7 and the tools on those of the carriers 10 to 13 aligned with the molds 2 and 3 are disengaged from those molds, which are open;

b. the pins 27 of the ring 26 (fixed to the shaft 9) are engaged in the holes 29 of the ring 28, the latter being still in the counterclockwise position shown by the dashed lines for lever 30 in FIG. 2.

At the upper limit of its travel, element D operates a contact 44, initiating operation of the hydraulic cylinder 37 to drive its piston to the left. Shaft 33 is thereby driven to the left in FIG. 2, rotating clockwise the ring 28 and hence shaft 9 and hub 8 with its tool assembly clockwise. The assembly therefore turns through an angle which is a submultiple of 360°, namely, 90° in the example under consideration.

It will be noted that in consequence of the coupling between shaft 33 and shaft 9 via link 31 and crank 30 there is obtained at the end of the rotation a decelerated motion which avoids shocks and sudden stops which might otherwise result due to the inertia of the tool assembly.

The tool carrying arms 10, 11, 12 and 13 are hence indexed one station, i.e. through 90°, in the embodiment illustrated. At the end of the outward motion of the shaft 33, the arm 41 operates the contact 43 which initiates:

a. closure of the molds by lowering of the shaft 9;

b. engagement of pins 7 in holes 7'; and c. decoupling of shaft 9 from the ring 28 due to withdrawal of pins 27 (fixed to ring 26) from the holes therefor in ring 28.

When these elements have been restored to the position shown in broken lines therefor, i.e. when the molds are closed, supply of pressure fluid to the hydraulic cylinder 37 is reversed, by action of a switch 44', so as to reverse the motion of the piston therein driving shaft 33 to the right in FIG. 2. This reverses the rotation of the ring 28, driving it in the direction indicated by the arrow F. This produces restoration of the crank 30 to its dashed line position. The accompanying counterclockwise rotation of ring 28 does not however rotate shaft 9. At the end of the return stroke of the cylinder there occurs ejection of the molded article by means of ejection mechanism to be described presently.

It will be noted that means are provided manually to position the tool assembly, as might be necessary in the event of sudden interruption of the operation of the machine, in order to restore it to proper operation.

The apparatus thus includes a disengageable coupling between the shaft 9 and ring 28. This coupling can be engaged and disengaged when the apparatus is in the position shown in full lines in FIG. 2, i.e. when the mold has just opened, the hub 8 being disengaged from the pins 7 whereas the pins 27 of the ring 26 are engaged in the holes 29 of the ring 28.

This disengageable coupling may comprise, as shown for example in FIG. 2, a stem 46 engaged in a central bore 47 of the shaft 9 and extending to a handle above the tool assembly, this stem being connected to the ring 26 by a pin 48. A groove 49 is provided in the shaft 9 to permit vertical displacement of the stem 46 and pin 48. A spring 50 extends between the lower end of the stem 46 and the bottom of the bore 47 and tends to stress the stem 46 and pin 48 upwardly. The pin 48 is thus stressed against the ring 26, which is held against a shoulder 26a on the shaft 9. The strength of the spring 50 is such that upon operation in an automatic manner the machine operates as if the ring 26 were affixed to the shaft 9.

Figure 2A:
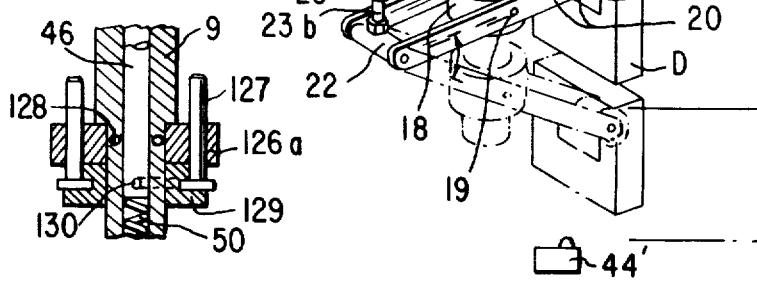
FIG. 2a is a fragmentary view representing a variant construction of part of the apparatus shown in FIG. 2.
Figure 3:
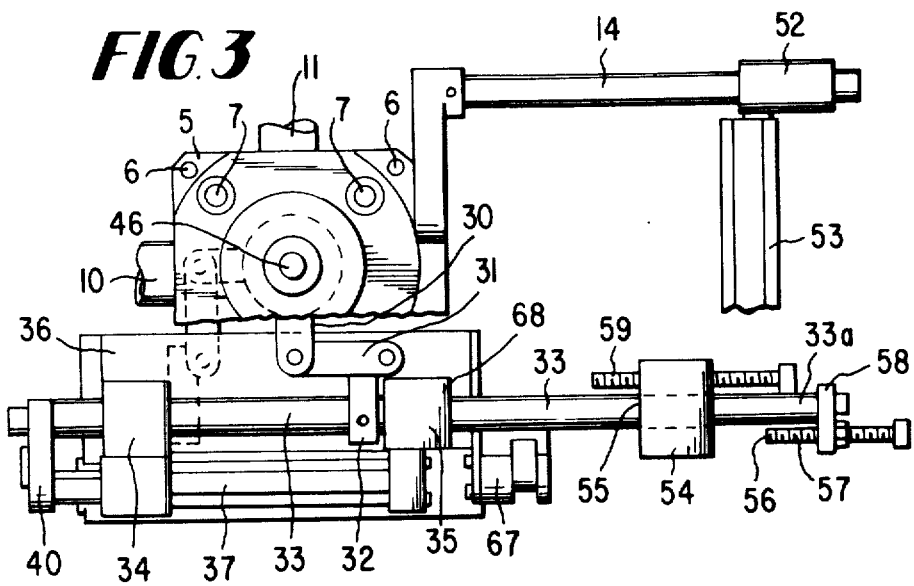
FIG. 3 is a schematic sectional view taken on the line III—III of FIG. 2.

In a variant construction, apparatus may be provided as shown in FIG. 2a wherein, in place of a single ring 26, there is disposed a ring 126a affixed with respect to the shaft 9 by pins 128 and having holes for the passage of vertical pins 127 which are carried by and fixed to a ring 129, fixed in turn to the stem 46 by pin 130 susceptible of motion along a groove in the shaft 9 as in the case of FIG. 2. It will be understood that in such a case the stem 46 operates on the ring 129, the ring 126a remaining stationary.

Returning to FIG. 2, when the apparatus is in the position shown in full lines, decoupling of the shaft 9 from the ring 28 is obtained by pressing in the direction of the arrow V on the stem 46 against operation of the spring 50. This forces the ring 26 downward, producing descent of the fingers 27 whereas the shaft 9 and consequently the tool assembly remain in upward position. When the fingers 27 have emerged from the holes 29 in the ring 28 it is possible freely to turn the tool assembly by hand so as to place it in a desired position.

The mechanism for ejection of the finished articles will now be further described with reference to FIGS. 3 to 6.

Ejection of the articles is effected by means of a carriage of known type. The carriage is generally indicated at 16 in FIG. 1 and comprises two sleeves 52 (FIG. 3) which slide on rods 14 of a support which is fixed to the body 5, the sleeves being connected by a transverse plate 53.

Figure 5:
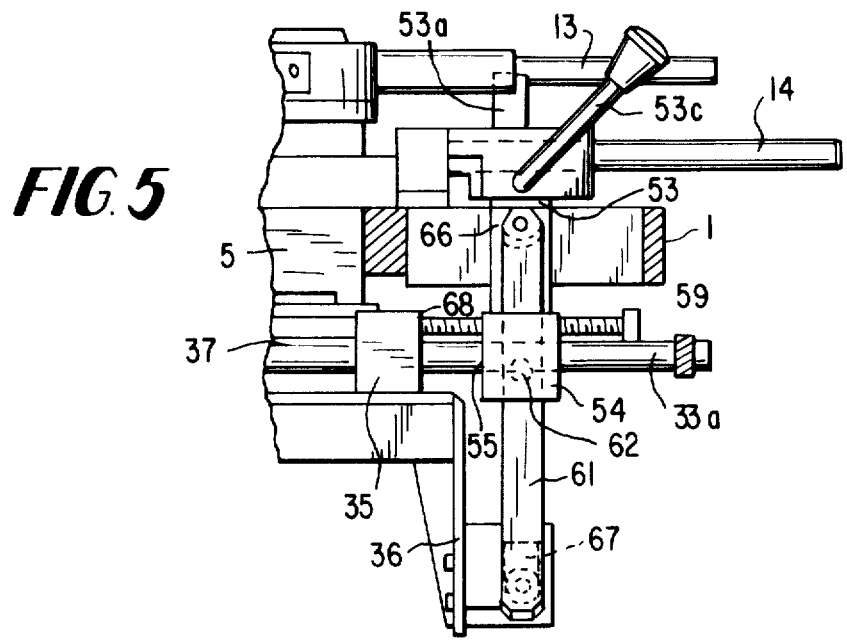
Figure 6:
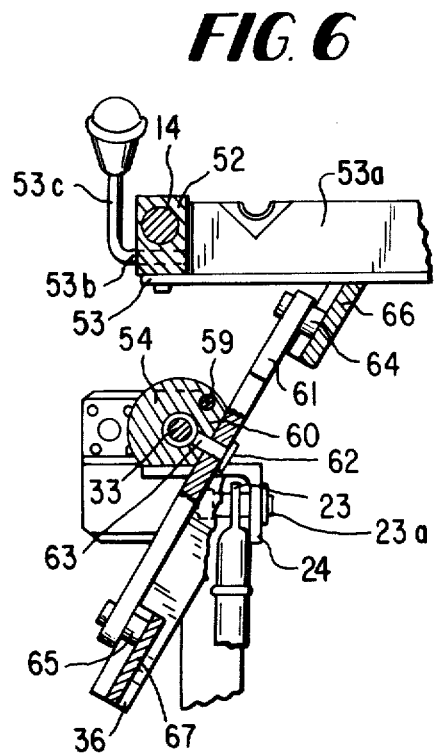
FIG. 6 is a sectional view taken on the line VI—VI of FIG. 4.

The transverse plate 53 supports a manually rotatable or rockable mold-opening device 53a (FIGS. 4, 5 and 6), supported more particularly on lateral shafts 53b which rotate in the sleeves 52 as shown in FIG. 6. One of the shafts 53b is extended into a handle 53c which is urged toward an upper position shown in full lines in FIG. 4 by operation of a spring 53d connected at one end to the handle and at the other end to one of the sleeves 52. Lowering of the handle 53c to the dash-line position of FIG. 4 produces rotation of mold opener 53a to the horizontal position therefor.

Displacement of the mold-opening carriage 16 lengthwise of the guide rods 14 is effected by motion of the shaft 33 under influence of the hydraulic cylinder 37.

The shaft 33 carries an ejector 54 which comprises a sleeve movable on the reduced diameter portion 33a of shaft 33. The ejector is thus slidingly mounted on the shaft 33a between the two stops constituted one by the shoulder 55 on shaft 33 and the other by the head of a threaded rod 57 which is adjustably screwed into a plate 58 fixed to the part 33a of the shaft 33. The ejector 54 is likewise fitted with a threaded rod 59 screwed into the interior of the ejector, the portion of this rod extending beyond the ejector toward the body 5 being subject to adjustment by rotation of rod 59. The threaded rods 57 and 59 make it possible to adjust the stroke of the ejector 54 and hence the stroke of the ejection carriage 16, as will be presently described.

On the internal face 60 of the ejector 54 there is mounted a transmission crank 61, pivotally mounted on the cylindrical portion 62 of a shaft whose end 63 is threaded into the ejector 54. The crank has as its two ends lugs 64 and 65 which cooperate with guide elements 66 and 67, respectively fixed to the ejector carriage plate 53 and to an element 36 fixed to the machine. The two guide elements 66 and 67 extend in vertical planes transversely to the length of the shaft 33.

Figure 4:
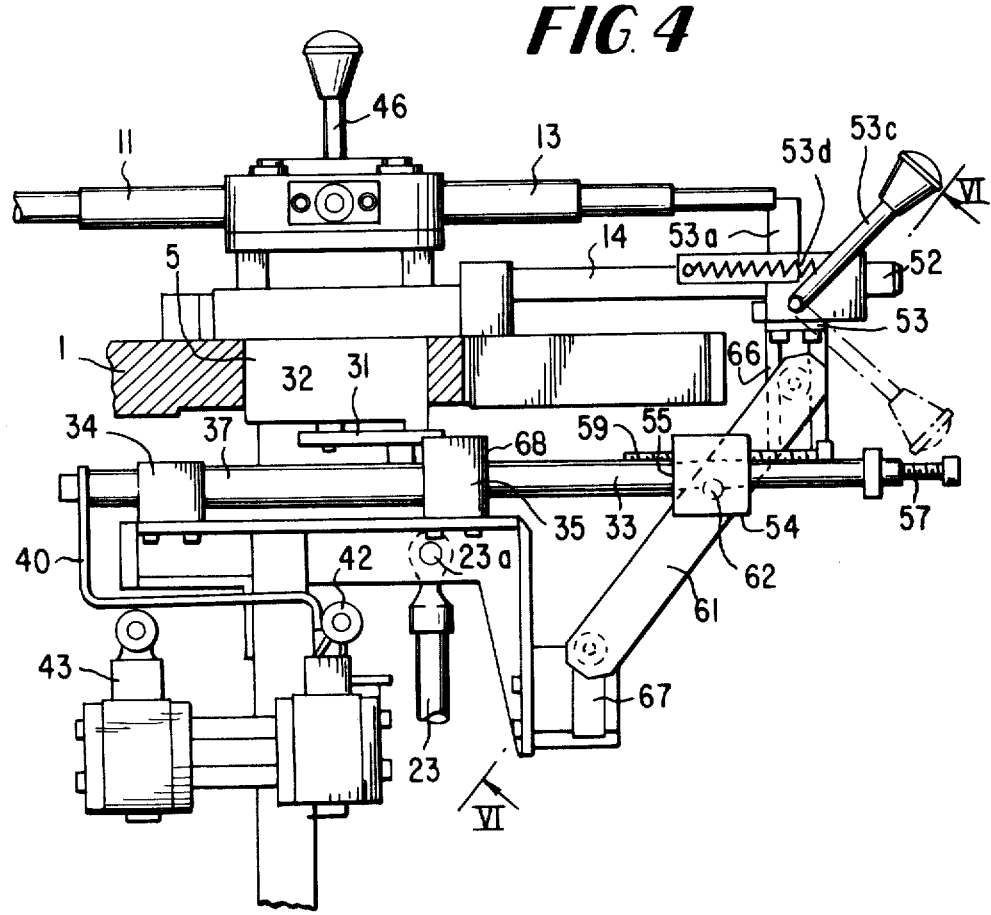
FIGS. 4 and 5 are views in elevation of the apparatus of FIGS. 2 and 3 showing operation of the ejection system and of the unmolding carriage.

It will now be understood that displacement of the ejector 54 lengthwise of the axis of the rod 33 will effect, as shown in FIGS. 4 and 5, displacement of the ejector carriage (16, 52, 53) in the same directions lengthwise as the guides 14. Specifically, displacement of the ejector 54 and hence of the ejection carriage 16 is effected by displacement of the shaft 33 under action of the hydraulic cylinder 37 in the course of the reciprocating motion of the latter.

Thus, at the end of a mold cycle, i.e. when the mold is closed and when the apparatus of the invention is in the position indicated in dash lines in FIG. 2, the cylinder 37 is at the end of its return stroke (to the right in FIG. 2) and the rod 33 is in its outer position as shown in FIG. 4.

In this position for the rod 33, the shoulder 55 will have pushed the ejector back to the maximum toward the right and the lever 61 will have displaced the carriage 16 to a maximum extent outwardly from the body 5 in the course of ejecting the finished article.

It will be noted in this connection that preferably the transmission coupling rod produces a demultiplication of motions which insures that for a given stroke of the ejector 54 a larger stroke occurs for the ejection carriage 16, e.g. one of twice the amplitude.

After ejection a new cycle begins with opening of the mold and this cycle continues with rotation of the tooling assembly consequent upon the outward stroke of the hydraulic cylinder 37. This stroke effects displacement of the rod 33 to the left, in FIGS. 2 and 4, as before. At the start of this displacement the ejector 54 and the ejection carriage 16 remain stationary until the end 56 of the rod 57 comes into contact with the ejector 54. When this takes place, the ejector 54 is carried along with that stem (to the left in FIG. 3) at the same time as the ejector carrige 16 until the screw 59 of the ejector 54 comes to bear against a stop 68 provided on the fixed bearing 35 in which the rod 33 moves. The ejector carriage 16 then finds itself in the position shown in FIG. 5.

At the end of the outward stroke of the cylinder 37, the ejection carraige is then ready to effect a new ejection and this takes place in the course of the return stroke of the cylinder.

It will be noted that whereas the ejection position of the carriage 16 (namely the position shown in FIG. 4) is fixed irrespective of the dimensions of the molded article to be ejected, the position of the carriage when at rest (as in FIG. 5) is adjustable by operation of the screw 59. It is thus possible to adjust the stroke of the carriage 16 as a function of the length of the articles manufactured.

FIGS. 7 to 11 show a variant construction according to the invention of which it will suffice to describe the portions which differ from the embodiment already described.

Thus, in this variant, the shaft 9 is fixed to a lower nut 70 including an annular groove 71 into which extend lugs 72 carried by pin 19. This pin belongs to a system for coupling the shaft 9 to the upper movable plate of the molding system identical with that already described. The nut 70 also includes four radial grooves 77 provided for effecting rotation thereof.

The connection between the shaft 9 and the driving ring 28 is effected by a pivoting finger 73 carried on a shaft 74 which is horizontal and which is fixed to the ring 28. This finger is provided to cooperate with the grooves 77 of the nut. The shaft 74 and, hence, the finger 73 may be subjected to a pivoting motion by action of a motor such as the hydraulic cylinder 75 which is coupled on the one hand to the ring 28 as shown in FIG. 10 and on the other hand to one end of a L-shaped member 76 the other end of which is fixed a portion 76 of L-shape fixed at one end to the shaft 74.

Figure 10:
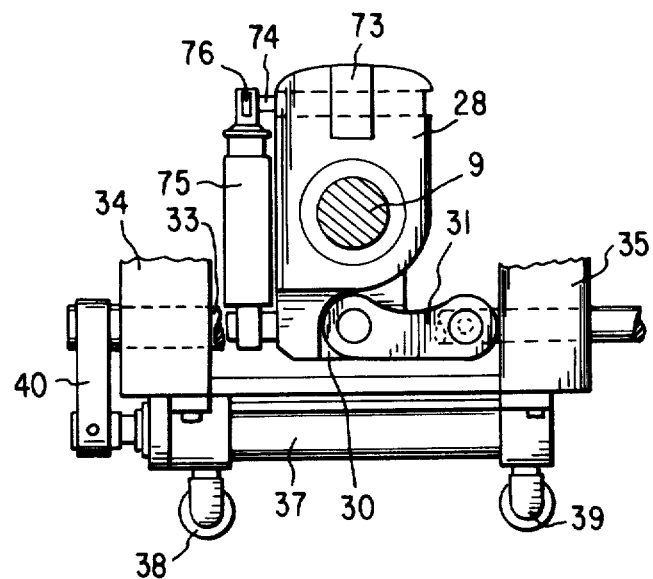
FIG. 10 is a sectional view taken on the line X—X of FIG. 9.

The hydraulic cylinder 75 may advantageously be a single acting cylinder driven in one direction only and returned by means of a spring back to the position of rest shown in full lines in FIG. 10.

Figure 9:
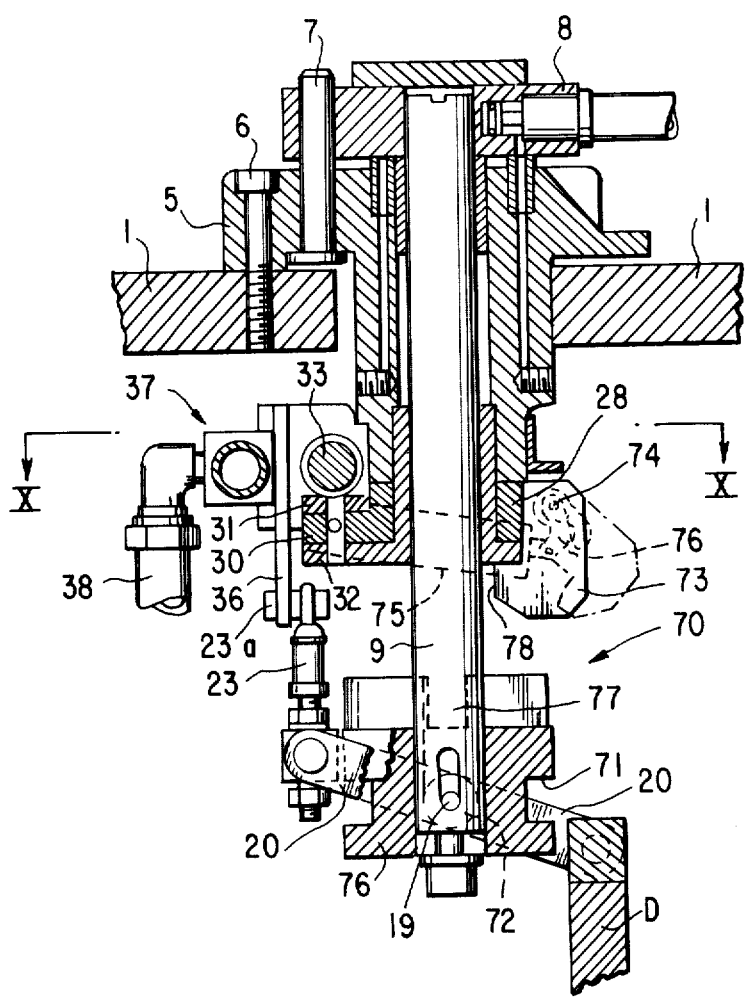
FIG. 9 is a sectional view taken on the line IX—IX of FIG. 8.

Upon upward motion of the shaft 9 and nut 70, a groove 77 of the latter will become engaged on the finger 73 which is in the position shown in full lines in FIG. 9. Operation of the cylinder 37 and hence of the rod 33 produces, as in the embodiment previously described, rotation of the ring 28 and hence of the shaft 9 by action of the finger 73 and nut 70.

Decoupling of the shaft 9 and ring 28 is easily accomplished by controlling opening of the finger 73 by the cylinder 75 so as to bring the finger into the position shown in dashed lines in FIG. 9. To this end, the cylinder can be controlled by a manual three-position valve not shown.

It will be noted that in this embodiment the ring 28 is also coupled to the rod 33 by a crank 31. However, this crank is directly articulated on the rod 33 at a pin 33a.

Figure 7:
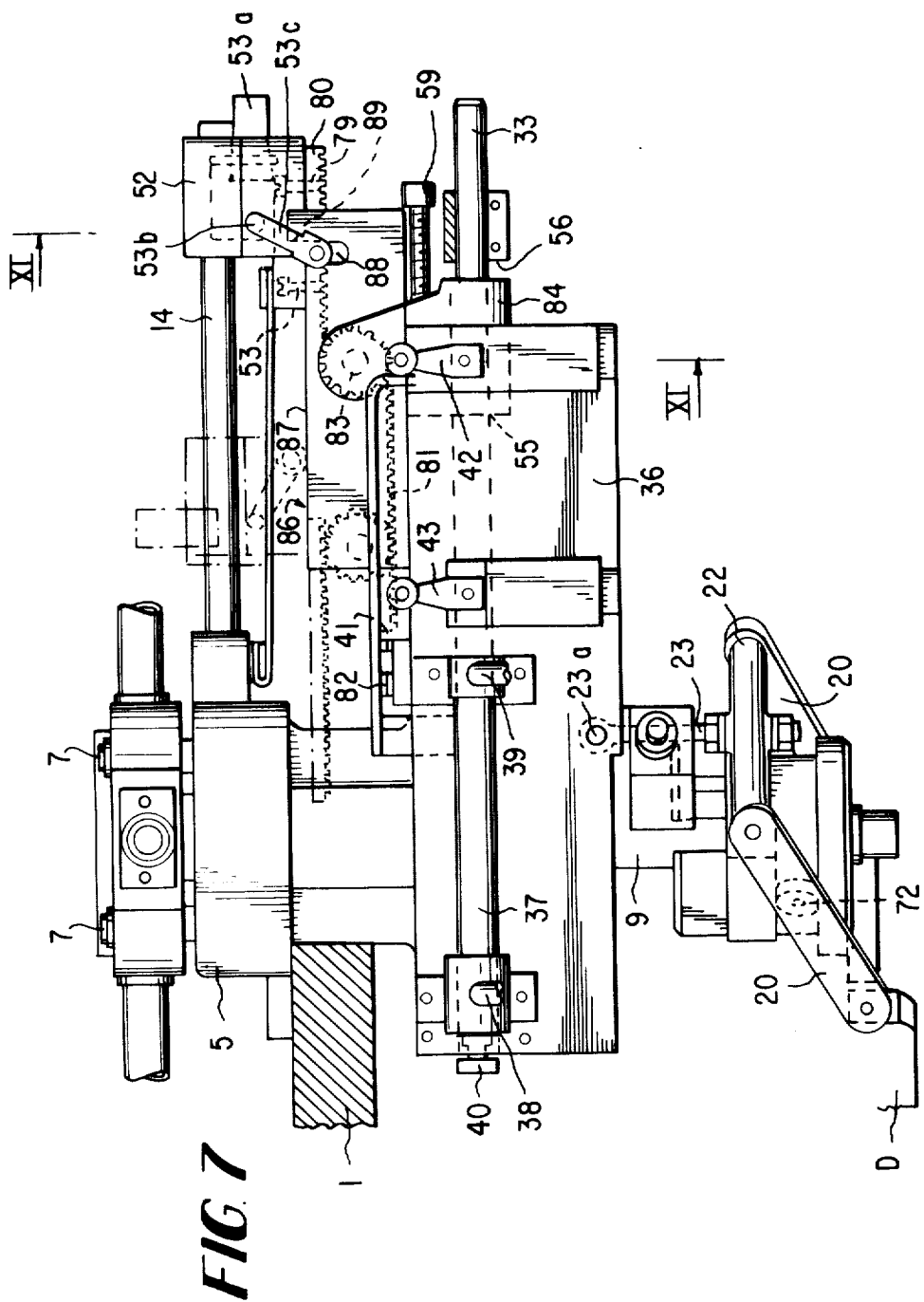
FIG. 7 is a view in elevation of a second form of apparatus in accordance with the invention.
Figure 8:
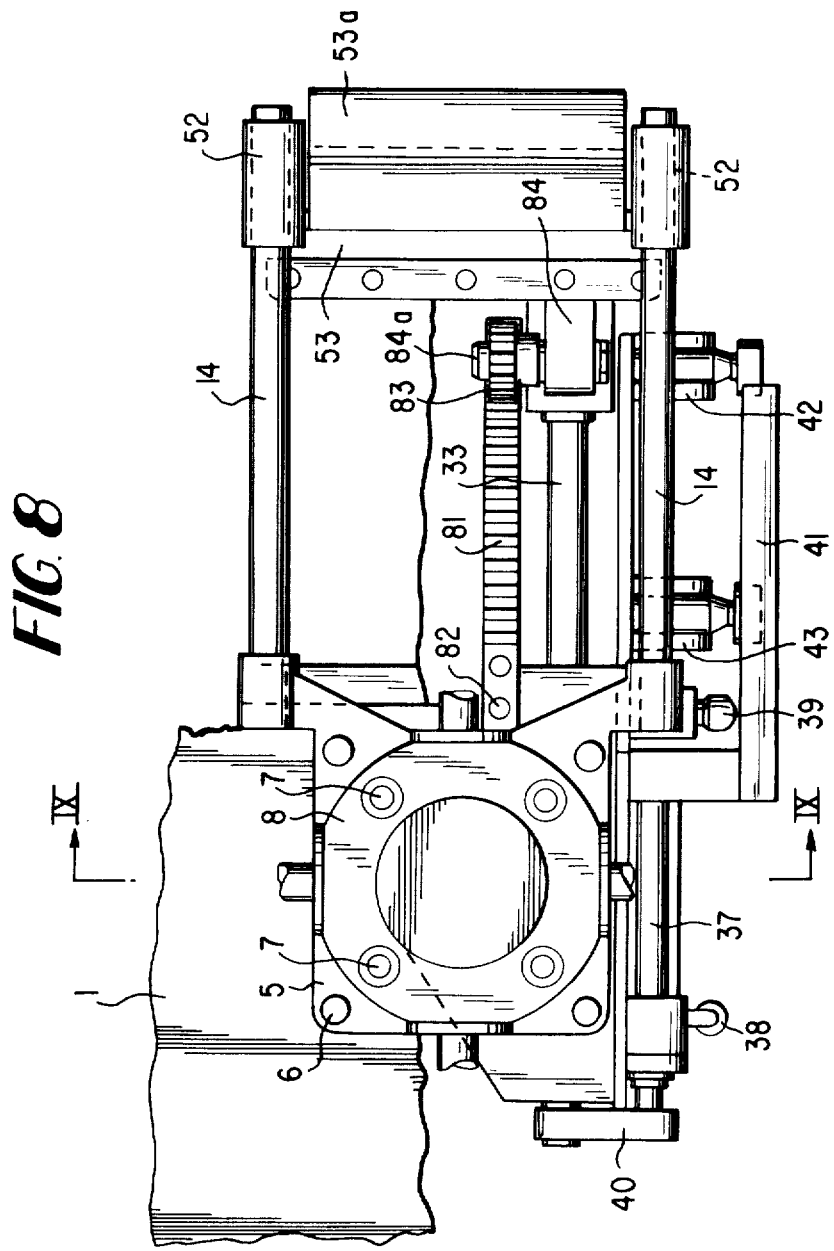
FIG. 8 is a plan view of the apparatus shown in FIG. 7.
Figure 11:
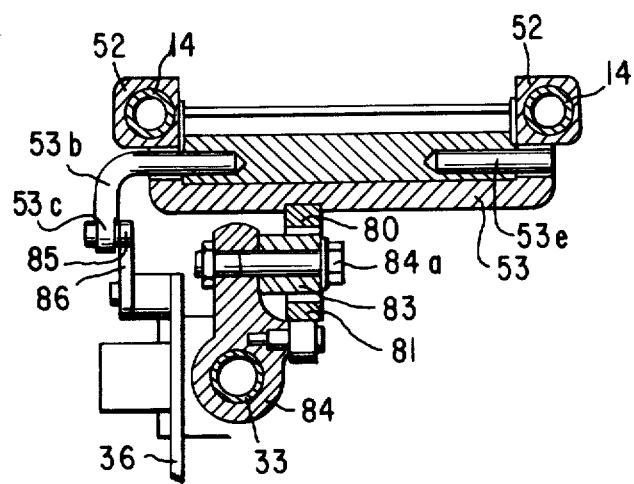
FIG. 11 is a sectional view taken on the line XI—XI of FIG. 7.

Another difference between this embodiment and that previously described pertains to the system for multiplication of motion between the ejector and the ejection carriage and also to means to cause pivoting of the ejector, shown in particular in FIGS. 7, 8 and 11.

In the embodiment of FIGS. 7 to 11, the motion multiplication mechanism comprises a rack and pinion. A first rack 80 is movably affixed beneath the ejection carriage 53 by means of screws 79. A second rack 81, fixed in position, is mounted by means of screws 82 on part of the stationary structure of the body 5.

The racks 80 and 81 face each other with a pinion 83 mounted between them for free rotation on an axle 84a on the ejector 84, the pinion engaging both of the racks. As in the preceding embodiment, the ejector 84 is mounted for sliding motion on the rod 33 and can move along that rod between stops 55 and 56. The ejector also supports a threaded control rod 59. It will be understood that with this construction when the rod 33 shifts, it carries with it the ejector 84 along and the pinion 83, which is obliged to rotate by action of the stationary rack 81. In the light of this movement, the stroke of the carriage 53 is twice that of the ejector 84.

It will also be noted that in this embodiment the rocking of the demolder 53a is automatically effected at the end of the stroke.

The demolding mechanism 53a is, as already indicated, fixed on shafts 53b and 53e which pivot on sleeves 52 of the carriage. The shaft 53b is extended at an L-shaped portion 53c carrying a follower 85. This follower cooperates with a guide ramp 86 having a plane portion 87 which terminates at the end of the arms 14 in a notch 88 whose width is slightly greater than the diameter of the follower. The notch therefore presents an elevated surface 89 having the function of a stop.

In the position shown in dashed lines in FIG. 7, the carriage is backed against the body 5 and the demolder is vertically disposed. The angular portion of the shaft 53b being lifted by the ramp 87.

When the carriage moves to the right in FIG. 7, the demolder remains in the position shown in dashed lines until the follower 85 falls into the slot or notch 88, the follower being immobilized and the carriage 53 continuing its motion, the shaft 53b rotates about the follower and produces pivoting of the demolder through 90° into the position shown in full lines therefor in FIG. 7.

Of course, the ramp 86 must be positioned and adjusted as a function of the stroke of the motion desired for the carriage 53. This method of pivoting makes it possible once the articles have been ejected horizontally, to position them vertically for further operations thereon.

The invention thus provides a tool assembly comprising a table 1, 4, 5, a plurality of first mold halves or portions 2, 3 disposed on the table, a mold carrier A having thereon a plurality of second mold portions movable toward and away from the table to close and to open the molds, a tool carrying turret 8, a shaft 9 supporting the turret and journaled in the table for rotation and axial motion with respect thereto, means E, D, 19, 20 coupling the shaft 9 to the mold carrier A for translation upon translation of the mold carrier, a first collar or drive means 28 journaled in the table and engaged about the shaft, means 30–33 to impose reciprocating angular motion on the first drive means 28, a second collar or drive means 26 engaged about the shaft and coupled thereto (at pin 48) for rotation therewith, and releasable torque transmitting means 27 coupling the first and second drive means together when the molds are open but not when they are closed. The tool assembly further desirably comprises means 46 to displace the second drive means 26 axially of the shaft to disengage the torque transmitting means even when the mold halves are open. Preferably the coupling means E, D, 19, 20 impose on the shaft 9 a motion smaller than the motion of the mold carrier A. Further the shaft 9 desirably includes means such as the shoulder 26a to limit axial motion of the second drive means 26 therealong, and resilient means such as spring 50 are provided stressing said second drive means against those motion limiting means.

While the invention has been described hereinabove in terms of a number of presently preferred exemplary embodiments thereof, the invention itself is not limited thereto but rather comprehends all modifications of and departures from those embodiments properly falling within the spirit and scope of the appended claims.

I claim:

1. A tool assembly comprising a table, a plurality of first mold portions disposed on the table, a mold carrier having thereon a plurality of second mold portions movable toward and away from the table to close and to open the molds, a tool carrying turret, a shaft supporting the turrent and journaled in the table for rotation and axial motion with respect thereto, means coupling the shaft to the mold carrier for translation upon translation of the mold carrier, a first drive means journaled in the table and mounted about the shaft to permit free rotation and axial motion of the shaft with respect to said first drive means, a reciprocating member and crank means coupling said reciprocating member to said first drive means to impose reciprocating angular motion on the first drive means, a second drive means engaged about the shaft and coupled thereto for rotation therewith, and releasable torque transmitting means coupling the first and second drive means together when the molds are open but not when the molds are closed.

2. A tool assembly according to claim 1 further comprising means to displace the second drive means axially of the shaft to disengage said torque transmitting means.

3. A tool assembly according to claim 2 wherein said shaft includes means to limit axial motion of said second drive means therealong and resilient means stressing said second drive means against said motion limiting means.

4. A tool assembly according to claim 1 wherein said coupling means impose on the shaft a motion smaller than the motion of the mold carrier.

5. A tool assembly according to claim 3 wherein said coupling means includes a lever coupled via a movable link to said table and coupled to said shaft and mold carrier at unlike distances from said link.

6. A tool assembly according to claim 1 including ejector means coupled to said reciprocating member.

7. A tool assembly according to claim 6 in which said ejector means comprise a carriage movable along guide ways perpendicular to said shaft.

8. A tool assembly according to claim 7 including motion multiplying means coupled between said reciprocating member and ejector means.

* * * * *

UNITED STATES PATENT AND TRADEMARK OFFICE
CERTIFICATE OF CORRECTION

PATENT NO. : 3,947,181
DATED : March 30, 1976
INVENTOR(S) : Henry Desjonqueres

It is certified that error appears in the above-identified patent and that said Letters Patent are hereby corrected as shown below:

Column 6, line 4, "as" should read --at--.

Column 7, line 16, delete "a portion 76 of L-shape fixed at one end".

Signed and Sealed this fifteenth Day of June 1976

[SEAL]

Attest:

RUTH C. MASON
*Attesting Officer*

C. MARSHALL DANN
*Commissioner of Patents and Trademarks*